(12) United States Patent
Berchtold et al.

(10) Patent No.: US 8,791,037 B1
(45) Date of Patent: Jul. 29, 2014

(54) ROBUST, HIGH TEMPERATURE-CERAMIC MEMBRANES FOR GAS SEPARATION

(75) Inventors: Kathryn A. Berchtold, Los Alamos, NM (US); Jennifer S. Young, Los Alamos, NM (US)

(73) Assignee: U.S. Department of Energy, Washington, DC (US)

( * ) Notice: Subject to any disclaimer, the term of this patent is extended or adjusted under 35 U.S.C. 154(b) by 729 days.

(21) Appl. No.: 12/482,718

(22) Filed: Jun. 11, 2009

(51) Int. Cl.
- *B01J 20/28* (2006.01)
- *B01J 35/00* (2006.01)
- *B01J 21/18* (2006.01)
- *B01J 21/06* (2006.01)
- *B01J 27/22* (2006.01)
- *B01J 27/224* (2006.01)

(52) U.S. Cl.
USPC .............. 502/4; 502/174; 502/175; 502/178; 502/200

(58) Field of Classification Search
USPC .................. 502/4, 60, 174, 175, 178, 200
See application file for complete search history.

(56) References Cited

U.S. PATENT DOCUMENTS

| | | | | |
|---|---|---|---|---|
| 4,699,892 A | * | 10/1987 | Suzuki | 502/4 |
| 5,464,798 A | * | 11/1995 | Jia et al. | 502/64 |
| 6,562,110 B2 | * | 5/2003 | Koros et al. | 96/4 |
| 6,663,805 B1 | * | 12/2003 | Ekiner et al. | 264/45.9 |
| 2005/0058871 A1 | * | 3/2005 | Li et al. | 429/30 |
| 2005/0139065 A1 | * | 6/2005 | Miller et al. | 95/45 |
| 2005/0268783 A1 | * | 12/2005 | Koros et al. | 96/14 |
| 2009/0318282 A1 | * | 12/2009 | Buekenhoudt et al. | 502/4 |

FOREIGN PATENT DOCUMENTS

WO    WO 2004/065316    * 10/2004

OTHER PUBLICATIONS

Liew et al., "Fabrication of SiCN MEMS by photopolymerization of pre-ceramic polymer", Sensors and Actuators a 95 (2002), 120-134.*
Kroke et al., "Silazane derived ceramics and related materials", Materials Science and Engineering, 26 (2000), 97-199.*

* cited by examiner

*Primary Examiner* — Elizabeth Wood
(74) *Attorney, Agent, or Firm* — Thomas S. O'Dwyer; James C. Durkis; John T. Lucas

(57) ABSTRACT

A method of making ceramic membranes, and the ceramic membranes so formed, comprising combining a ceramic precursor with an organic or inorganic comonomer, forming the combination as a thin film on a substrate, photopolymerizing the thin film, and pyrolyzing the photopolymerized thin film.

24 Claims, 2 Drawing Sheets

ROBUST, HIGH TEMPERATURE-CERAMIC MEMBRANES FOR GAS SEPARATION

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. W-7405-ENG-36 awarded by the U.S. Department of Energy and Los Alamos National Laboratory.

CROSS-REFERENCE TO RELATED APPLICATIONS

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to membranes for gas separation applications.

2. Description of Related Art

Note that the following discussion may refer to publications that due to recent publication dates are not to be considered as prior art vis-a-vis the present invention. Discussion of such publications herein is given for more complete background and is not to be construed as an admission that such publications arerior art for patentability determination purposes.

Membranes for gas separation offer low energy requirements, low capitol costs, low maintenance, and facile operation. The market for gas separation membrane equipment has grown over the past 20 years to a multi-$100 million/year business. Separation of non-condensable gases such as nitrogen from air, carbon dioxide from methane, and hydrogen from nitrogen, argon, or methane represent 90% of this business. Furthermore, the chemical, refining and electric power industries have all identified membrane technology development as a high research and development priority. For example, the chemical industry seeks development of high temperature, chemically inert membrane materials suitable for hydrophilic compounds in dilute streams, and mixed organic/inorganic composite membranes. Refining, the most energy intensive industry in the U.S., spends about 40% of the energy it consumes on distillation processes. Refiners seek chemically resistant membranes developed for hydrocarbon separations with the goal of reducing energy consumption by 20%. In the power industry, high temperature membranes would be valuable in separating H2 from CO2 in shifted synthesis gas or in incorporation into a membrane catalytic reactor, improving the efficiency of the water-gas shift reaction. Additionally, carbon dioxide sequestration costs are estimated at $100-$300 per ton of carbon emissions avoided using present technology. The power industry hopes to reduce this cost to $10 per ton of carbon emissions avoided by the year 2015. Achieving this goal would save the U.S. trillions of dollars. High temperature membrane technology is key to realizing this goal. Finally, with the advent of the U.S. Government's Hydrogen Fuel Initiative ("HFI"), the demand for membrane gas separations will likely increase further.

In order to address these current and emerging separation needs, inexpensive materials with greater thermal and chemical stability than are commercially available today are required. Development pathways to date have included ceramic membranes, carbon membranes, high temperature polymer membranes, and zeolites. The most promising of these pathways are the ceramic membranes. For example, continuous films of zeolites suitable for selective gas separations are notoriously difficult to fabricate on a laboratory scale, much less on the scale required for an industrial gas separation application. Zeolite membranes have been implemented commercially for dehydration of organic solvent using pervaporation, a process that can tolerate larger imperfections in the membrane structure. Alternatively, carbon membranes are relatively easy to fabricate, but densify in the presence of humidity, lose selectivity in oxygen environments due to pore enlargement at the elevated temperatures of interest, and are not sufficiently mechanically stable. Good progress has been made recently in the development of high temperature polymeric membranes. Even so, their operational temperatures are still limited to less than 400° C. Compared to polymer membranes, ceramic membranes based on silica, alumina, titania and zirconia have demonstrated larger permeabilities and selectivities and are less susceptible to degradation of selectivity as the temperature of the operation is increased. Additionally, these materials are also typically brittle and difficult to fabricate defect free. Defects on the order of 30 A are large enough to reduce selectivity in gas separation applications to below acceptable levels.

Polymer derived ceramics is a relatively young research area. Kroke, E., et al., Materials Science and Engineering Reports, 26, 97-199 (2000); Liew, L., et al., "Fabrication of S:CN MEMS by Photopolymerziation of Pre-Ceramic Polymer," Sensors and Activators A 95, 120-134 (2002). With this technique, new types of ceramic materials for high temperature applications can be processed at relatively low temperatures (compared to traditional ceramic fabrication methods; Bengisu, M., Engineering Ceramics, Springer-Verlag: Berlin (2001)). Additionally, because the ceramic takes the form of its polymeric precursor, one can fabricate ceramic structures of geometries that are not possible with traditional ceramics fabrication techniques. See, e.g., Patent Cooperation Treaty Publication No. WO 2004/065316 A2, "Polymer Derived Ceramic Materials", to Bowman, C., et al. (Aug. 5, 2004).

The present invention involves production of ceramic membranes via pyrolysis of a *thin polymer film. These types of ceramic materials, e.g., Si—C—N, are not amenable to the traditional membrane fabrication techniques and thus, have not previously been formed into membranes. These ceramics will be quite thermally, mechanically, and chemically stable. They will also have useful gas selectivity and permeability, as one would expect based on their counterparts that are fabricated via conventional methods, thereby providing a significant advance in high temperature membrane technology.

BRIEF SUMMARY OF THE INVENTION

The present invention is of a method of making ceramic membranes (and the ceramic membranes so formed), comprising: combining a ceramic precursor with an organic or inorganic comonomer; forming the combination as a thin film on a substrate; photopolymerizing the thin film; and pyrolyzing the photopolymerized thin film. In the preferred embodiment, the ceramic precursor comprises a silazane oligomeric ceramic precursor and the comonomer comprises one or more of a photopolymerizable silazane and photopolymerizable thiol. Photopolymerizing comprises bombarding the thin film with one or more of ultraviolet radiation, visible radiation, and electron beam radiation. The result of the photopolymerization preferably comprises a homogeneous crosslinked polymeric, preceramic, thin film, more preferably an amorphous and/or crystalline ceramic molecular sieve membrane, and most preferably wherein the molecular sieve membrane maintains gas productivity and selectivity up to at least approximately 1000° C. (preferably with substantially no oxide). A photoinitiator may be provided to the combination. Heteroatoms may be introduced, preferably boron, titanium, aluminum, phosphorus, or combinations thereof, most preferably wherein the introducing step comprises introducing heteroatoms via monomeric and/or oligomeric silazanes containing the heteroatoms.

The invention is also of a method of making ceramic membranes (and the ceramic membranes so formed), comprising: forming a polymeric ceramic precursor as a thin film on a substrate; processing the thin film at temperatures never exceeding approximately 60° C.; and after processing, pyrolyzing the thin film to form a ceramic membrane. In the preferred embodiment, the ceramic precursor comprises a silazane oligomeric ceramic precursor, most preferably wherein the ceramic precursor additionally comprises one or more of vinyl functionalized, oligomeric, inorganic or organic silazanes, difunctional thiols, and tetrafunctional thiols. Processing preferably comprises photopolymerizing, more preferably wherein the result of the photopolymerizing step comprises a homogeneous crosslinked polymeric, preceramic, thin film and/or additionally providing to the combination a photoinitiator. The result of the pyrolyzation is preferably an amorphous and/or crystalline ceramic molecular sieve membrane, most preferably wherein the molecular sieve membrane maintains gas productivity and selectivity up to at least approximately 1000° C. and/or wherein the molecular sieve membrane comprises substantially no oxide. Heteroatoms may be introduced, preferably one or more of boron, titanium, aluminum, and phosphorus, and most preferably wherein the heterotatoms are introduced via monomeric and/or oligomeric silazanes containing the heteroatoms.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

This invention is a novel route to robust ceramic membranes for high temperature applications and the membranes formed via this novel route. The invention provides a means for fabricating molecular sieving membranes with gas permeation and chemical, mechanical, and thermal stability characteristics that can be manipulated by the novel formation process. Thus, these membranes can be tailored to permeate different gases at different rates, thereby allowing for separation of gases over a wide range of temperatures.

This invention, for the first time, provides a rational approach to the design of synthesis processes for robust ceramic membranes with high gas permselectivity. The unique interrelationships between monomer/comonomer composition, comonomer functionality, and photo polymerization and pyrolysis conditions have a profound effect on the kinetics, network structure, and macroscopic properties of the resulting material. As a result, the present invention can be widely tailored to control the membrane product and its separation characteristics. This accomplishment provides a great improvement in high temperature membrane technology, enabling production of economically viable membrane modules that significantly increase the energy efficiencies of a number of energy intensive processes. The preferred embodiment employs the novel combination of thiol-ene step growth photopolymerization and preceramic polysilazane chemistries.

Figure 1:
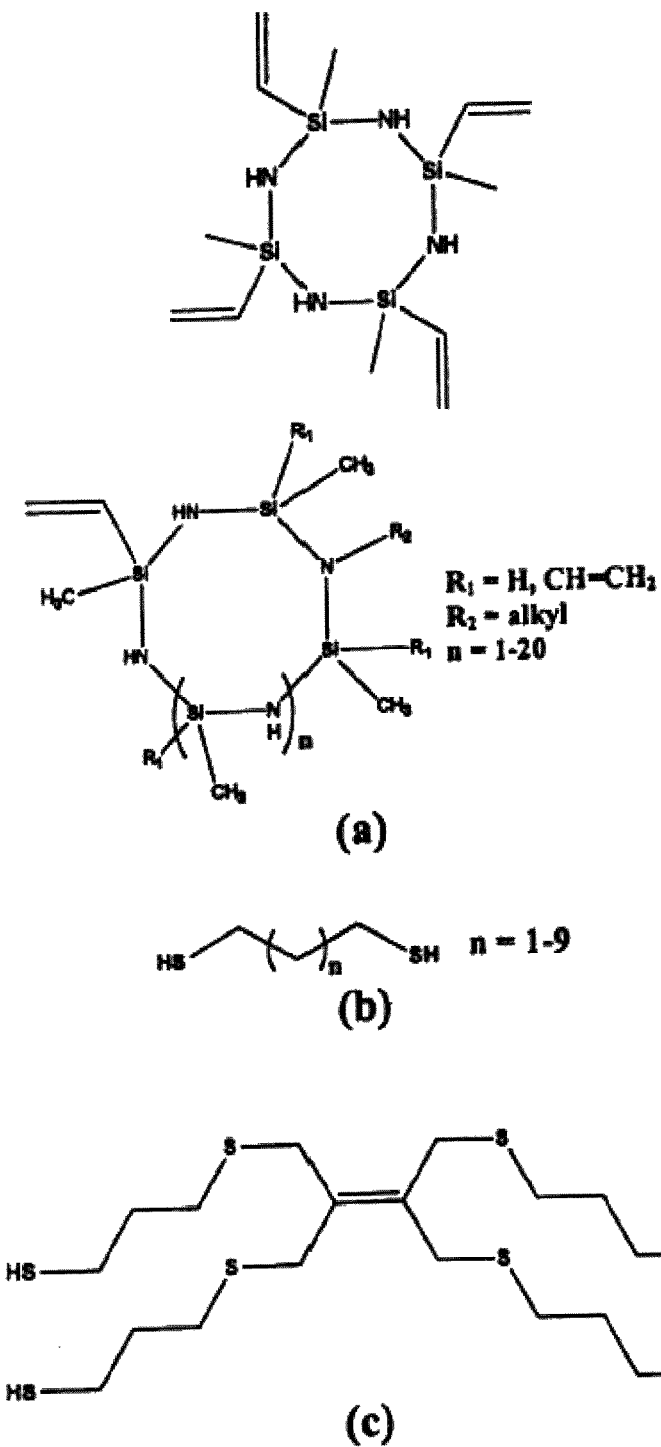
FIG. 1 illustrates examples of inorganic-organic Si/C/N ceramic precursors useful according to the invention, including: (a) vinyl functionalized, oligomeric, inorganic-organic silazanes; (b) difunctional thiols with various alkyl spacer lengths; and (c) tetrafunctional thiols of various composition.
Figure 2:
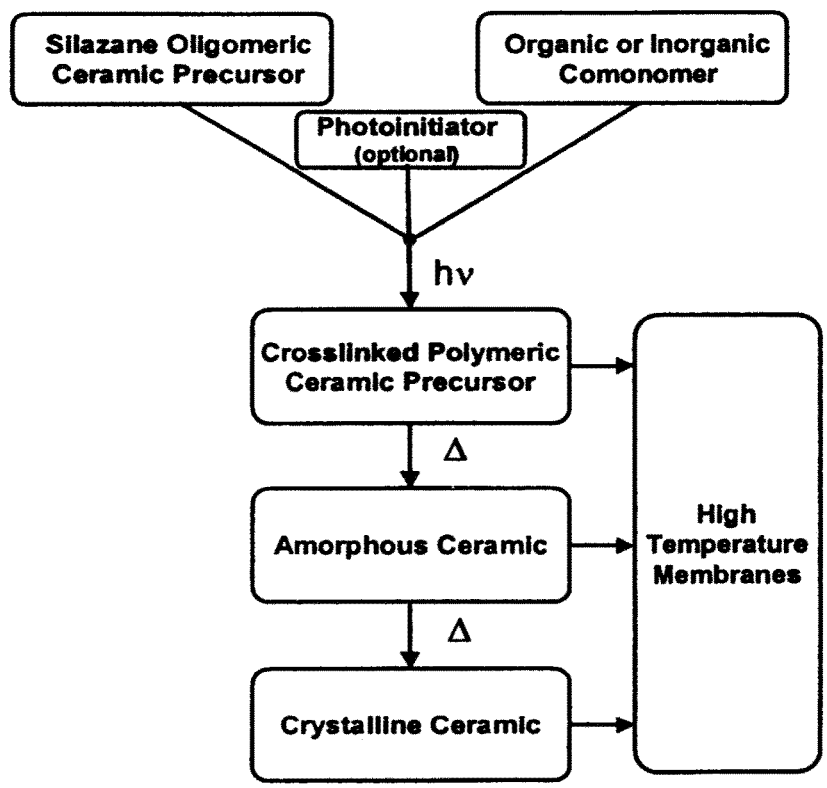
FIG. 2 illustrates the preferred processes of the invention.

The invention provides a novel processing route to ceramic membranes and the application of these membranes to high temperature gas separation applications. This route utilizes the synthesis of polymeric ceramic precursors from inorganic-organic monomeric and/or oligomeric ceramic precursors. Fabrication of a membrane using this technique begins with the combination of a preceramic precursor, such as ene (vinyl) functionalized oligomeric silazane, material, with an organic or inorganic comonomer, e.g., a multifunctional alkane thiol (FIG. 1). A thin film is then formed on a substrate. Electromagnetic radiation is subsequently used to photopolymerize those starting materials (regions of primary interest are UV, visible, and E-beam), either with or without photoinitiator (thiols self initiate; Cramer, N., et al., Macromolecules, 35, 5361 (2002)). The thiol-ene polymerization occurs via a step growth mechanism forming a homogeneous crosslinked polymeric, preceramic, thin film/membrane. This film is then pyrolyzed under the appropriate conditions to obtain amorphous and/or crystalline ceramic molecular sieve membranes that are chemically, thermally, and mechanically robust and will maintain gas productivity and selectivity to temperatures preferably in excess of approximately 1000° C. (FIG. 2). The ability to synthesize such robust materials is a function of the ability to produce oxide as well as non-oxide containing ceramics via this novel route. Non-oxide containing ceramics are of particular interest for high temperature gas separations due to their excellent resistance to thermal shock, corrosion, creep, densification, reduction, and oxidation. However, oxide containing ceramics can also usefully be formed via the invention.

The composition and architecture of the crosslinked polymeric film and correspondingly the material properties and separation productivity of the membrane product can be tailored by the ratio of the initial organic/organic-inorganic comonomers (silazane/thiol), by the comonomer functionality (e.g., dithiol vs tetrathiol and the ratio of the two when used in tandem), by the comonomer chemistry, by the photopolymerization conditions (light intensity and wavelength(s), concentration and type of initiator or lack thereof, photopolymerization environment, e.g., inert vs. air) by the pyrolysis conditions (ramp rate to pyrolysis temperature, time at temperature, gas environment). Properties can be tailored further by introducing heteroatoms such as boron, titanium, aluminum, and phosphorous, via monomeric and/or oligomeric borosilazanes, phosphorosilazane, etc. leading to Si/(B,Ti,Al, or P)/C/N ceramics as compared to the Si/C/N materials obtained from the aforementioned silazane materials.

The advantages of this invention over current technologies include:

(1) The low processing temperatures that can be used for these ceramic materials compared with those necessary using traditional ceramic fabrication methods. Utilization of radiation curing processes for crosslinked polymeric ceramic precursor synthesis enables ambient processing. Typical processing steps for ceramic synthesis utilize multiple steps at elevated temperatures ranging from −60 to 500° C. prior to final pyrolysis.

(2) Because the ceramic takes the form of its polymeric precursor, one can fabricate ceramic structures of geometries that were not possible with traditional ceramics fabrication techniques.

(3) The invention enables production of non-oxide containing ceramic membranes via pyrolysis of a thin polymer film. Non-oxide containing ceramics are of particular interest for high temperature gas separations due to their excellent resistance to thermal shock, corrosion, creep, densification, reduction, and oxidation. These non-oxide ceramic materials are not amenable to the traditional membrane fabrication techniques and thus, have not previously been formed into membranes.

(4) The current state-of-the-art membranes for gas separations have severe temperature limitations. Those membranes that are able to operate at elevated temperatures suffer from significant mechanical property limitations and difficulty in and expense of manufacture.

(5) The high operating temperatures that can be achieved with the ceramic materials of the invention, preferably greater than 1000° C., allow them to be used on streams where membranes are typically not a viable separations option. Use on such streams typically leads to significant energy savings over other separations technologies.

(6) The materials of the invention are chemically and mechanically stable and thus, are operable in a wide variety of environments that typically lead to membrane failure.

(7) The photopolymerization process occurs in seconds to minutes versus hours for the currently used ceramic membrane fabrication techniques.

The dominant polymerization method used currently for formation of bulk polymer derived ceramics (PDCs) is a thermally driven polymerization that proceeds by several different simultaneous mechanisms, although this aspect of the process is not well characterized. In the PDC literature, authors normally refer to "thermally setting" the material prior to further processing typically at temperatures between 200 and 500° C. for periods of hours. Vinyl functionalities often incorporated onto the precursor backbone are utilized in conjunction with a peroxide initiator to drive a thermally induced chain polymerization. Such polymerizations are known to produce very heterogeneous polymer networks, and thus, heterogeneous amorphous materials with compromised mechanical, chemical, and thermal stabilities. Alternatives to these polymerization processes according to the invention, including step-growth photopolymerization using thiol-enes, are a novel and powerful means to produce a homogeneous crosslinked network that, when pyrolyzed, will result in a much stronger and flexible material suitable for membrane applications.

The advantages of photopolymerization include rapid curing at room temperature, low energy requirements, chemical versatility, solvent-free processing, spatial and temporal control of the polymerization, and low environmental impact.

The use of thiol-ene polymerization chemistries in conjunction with a photoinduced mechanism for membrane formation takes advantage of all the aforementioned traits inherent to photopolymerization plus the complimentary features unique to thiol-ene step growth reactions. Namely, incorporating factors such as reduced polymerization shrinkage, production of a more homogeneous polymer network than is achieved by traditional free-radical polymerizations, rapid polymerization kinetics, and greater resolution in x, y, and z fabrication dimensions.

In the bulk, non-oxide amorphous ceramic materials demonstrate excellent creep, corrosion, chemical, radiological, and oxidation resistance. These properties are complimented by high tensile strength and hardness characteristics as well as outstanding temperature stability. In fact, amorphous phase thermal stabilities as high as 1800° C. have been achieved with this new class of materials. These materials have not, however, been characterized as thin films, such as those useful in membrane applications. Such high thermal stabilities in bulk characterization, indicate that these materials are excellent candidates for high temperature gas separation applications. While the processing method of the invention is novel, there is no reason to believe that the listed properties will be compromised.

To reiterate, thin ceramic films suitable for membrane applications are preferably formed via photopolymerization of liquid preceramic monomer/comonomers followed by pyrolysis under controlled temperature, ramp rate, and atmosphere. Each of the process variables, including initial preceramic monomer/comonomer composition, comonomer functionality, photopolymerization conditions, and pyrolysis conditions, has a profound affect on the processes mechanistic paths and kinetics. Correspondingly, those variables also dictate film mechanical properties, effective porosity, and gas permselectivity. Specifically, the effective pore size is controllable to tailor the membrane for the separation of a small molecule, such as $H_2$, or a larger molecule such as $CO_2$, without sacrificing permeability.

To date, the majority of work regarding polymer derived ceramics presented in the literature focuses on manipulating the ceramic microstructure and properties via the pyrolysis process and post polymerization processing of the preceramic polymer, i.e., pulverization, milling, molding, etc. Correspondingly, many of the advantages of manipulating the polymer structure via the polymerization process itself are overlooked by this predominantly ceramics oriented, i.e., non-polymer, research community.

The use of thiol-ene polymerization chemistries in conjunction with a photoinduced mechanism for membrane formation takes advantage of all the aforementioned traits inherent to photopolymerization plus the complimentary features unique to thiol-ene step-growth reactions. Jacobine, A. F., Radiation Curing in Polymer Science and Technology, Volume III: Polymerisation Mechanisms, J. P. Fouassier and J. F. Rabek, eds., Elsevier: New York. Chapter 7, 219 (1993). Namely, incorporating factors such as reduced polymerization shrinkage, production of a more homogeneous polymer network than is achieved by traditional free-radical polymerizations, rapid polymerization kinetics, and greater resolution in x, y, and z fabrication dimensions.

The materials further usefully employed in the invention fall into two categories: the monomeric or oligomeric ceramic precursors and the multifunctional thiol monomers. The ceramic precursors of primary interest are vinyl functionalized, inorganic-organic silazanes. The composition and functionality of the thiolated comonomer is another variable that can be used to control the crosslinked polymer product properties. Non-oxygen containing alkane dithiols with varying chain lengths and tetrathiols both independently and in tandem are preferred. Examples of these materials are presented in FIG. 1.

Comonomer concentration (silazane/thiol), comonomer functionality (e.g., dithiol vs tetrathiol and the ratio of the two when used in tandem), and dithiol chain length are system variables that allow for controlled manipulation of the polymerization kinetics, network formation characteristics, and correspondingly, the final properties of the polymer product.

Polymer films should be formed utilizing the photo-induced free-radical step-growth thiol-ene polymerization of the invention where the "ene" functionality is incorporated via the silazane ceramic precursor. Polymerization will preferably be conducted on bulk materials, i.e., no solvent is needed. The common UV photoinitiator, 2,2-dimethoxy-2-phenylacetophenone, will preferably be used to adjust the initiation kinetics. A unique feature of these thiol-ene reactions is their ability to self-initiate; therefore the use of a separate photoinitiator is optional, providing an additional level of control over the molecular composition and homogeneity of the polymer product.

The polymer material properties are intimately linked to the properties of the monomeric/oligomeric reactants, the polymerization mechanism utilized, the reaction conditions (temperature, atmosphere, initiation rate (irradiation intensity, initiator concentration, and self initiating monomer concentration, and initiation wavelength(s))), and the extent of conversion of the reactive functionalities. All of these factors cumulatively dictate the polymerization kinetics and correspondingly, the material and chemical properties of the polymer product and thus, its separation characteristics.

Formation of an amorphous ceramic membrane is preferably accomplished by heating and pyrolysis of the polymeric ceramic precursor fabricated via the step-growth photopolymerization described previously. Just as the polymer fabrication conditions and kinetics play a large role in property determination, so do pyrolysis conditions and kinetics. Thus, an understanding of the dependence of the polymer/ceramic structure/properties on the material's thermal history is essential.

Pyrolysis of the crosslinked polymeric ceramic precursors should preferably be conducted in several different atmospheres, namely, under air, vacuum, nitrogen, argon, and ammonia, where the atmosphere dictates the pyrolysis chemistry and thus, relative Si—C—N compositions in the final product with attainable compositions ranging from pure SiC to pure Si3N4. The heating rate, ultimate temperature, soak time at temperature, and cooling rate are also preferably used to control the polymer to amorphous ceramic transition and thus, the product properties.

The present invention is particularly relevant to hydrogen separation. A recurring theme in the production of hydrogen is the separation of hydrogen from carbon dioxide or carbon monoxide and other minority components. There are a number of processes where it would be advantageous to perform the separation using membranes at elevated temperatures. For example in a water-gas-shift reactor, removing the hydrogen at the temperature of reaction (200-700° C.) would improve the efficiency of the process. The invention provides robust ceramic membranes that will selectively transport hydrogen at up to 1000° C. and higher. This novel route utilizes preceramic polymeric precursors which gives one the ability to use established and economical polymer membrane fabrication techniques.

The present invention also addresses the long-standing issue of ceramic durability. Bulk engineering ceramics have been prepared using the invention and have proven to be much more robust than traditional ceramics. This result is due to the final composition of the ceramic, which cannot be obtained using standard ceramic fabrication techniques.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of making ceramic membranes, the method comprising the steps of:
combining a monomeric and/or oligomeric silazane ceramic precursor with a comonomer comprising one or more of the group consisting of ene (vinyl) functionalized, oligomeric, inorganic or organic silazanes, difunctional thiols, and tetrafunctional thiols;
forming the combination as a thin film on a substrate;
photopolymerizing the thin film; and
pyrolyzing the photopolymerized thin film so as to result in a ceramic membrane that contains substantially no oxide.

2. The method of claim 1 wherein photopolymerizing comprises bombarding the thin film with one or more of the group consisting of ultraviolet radiation, visible radiation, and electron beam radiation.

3. The method of claim 1 wherein the result of the photopolymerizing step comprises a homogeneous crosslinked polymeric, preceramic, thin film.

4. The method of claim 3 wherein the result of the pyrolyzing step is an amorphous or crystalline ceramic molecular sieve membrane that maintains gas productivity and pore size selectivity up to at least approximately 1000° C.

5. The method of claim 1 wherein the result of the pyrolyzing step is a ceramic membrane that comprises an amorphous or crystalline ceramic molecular sieve membrane which maintains gas productivity and pore size selectivity up to at least approximately 1000° C.

6. The method of claim 1 additionally comprising the step of:
providing to said combination, a photoinitiator.

7. The method of claim 1 additionally comprising:
introducing heteroatoms selected from the group consisting of boron, titanium, aluminum, phosphorus, and combinations thereof, via said monomeric and/or oligomeric silazanes containing the heteroatoms.

8. A ceramic membrane formed by the process of claim 1.

9. A method of making ceramic membranes, the method comprising the steps of:
combining a monomeric and/or oligomeric silazane ceramic precursor with a comonomer comprising one or more of the group consisting of ene (vinyl) functionalized, oligomeric, inorganic or organic silazanes, difunctional thiols, and tetrafunctional thiols;

depositing said combination as a thin film on a substrate;

photopolymerizing the thin film at temperatures never exceeding approximately 60° C.;

selecting at least one of the following parameters comprising the heating ramp rate, ultimate temperature, soak time at temperature, the cooling rate and the gas atmosphere environment when pyrolyzing the photopolymerized thin film; and producing an amorphous or crystalline ceramic molecular sieve membrane.

10. The method of claim 9 wherein-photopolymerizing comprises bombarding the thin film with one or more of the group consisting of ultraviolet radiation, visible radiation, and electron beam radiation.

11. The method of claim 9 wherein the result of the photopolymerizing step comprises a homogeneous crosslinked polymeric, preceramic, thin film.

12. The method of claim 9 additionally comprising providing to said combining step, a photoinitiator.

13. The method of claim 9 wherein the result of the producing step is said molecular sieve membrane that maintains gas productivity and pore size selectivity up to at least approximately 1000° C.

14. The method of claim 9 wherein the molecular sieve membrane comprises substantially no oxide.

15. The method of claim 9 additionally comprising:
introducing heteroatoms selected from the group consisting of boron, titanium, aluminum, phosphorus, and combinations thereof, via said monomeric and/or oligomeric silazanes containing the heteroatoms.

16. A ceramic membrane formed by the process of claim 9.

17. The method of claim 1 wherein the conmonomer comprises at least two photopolymerizable chemical groups.

18. The method of claim 17 wherein the photpolymerizable chemical groups are selected from —SH and vinyl.

19. The method of claim 9 wherein the comonomer comprises at least two photopolymerizable chemical groups.

20. The method of claim 19 wherein the photpolymerizable chemical groups are selected from —SH and vinyl.

21. The method of claim 6 wherein the photoinitiator is 2,2-dimethoxy-2-phenylacetophenone.

22. The method of claim 12 wherein the photoinitiator is 2,2-dimethoxy-2-phenylacetophenone.

23. The method of claim 1 wherein the thiolated comonomer comprises non-oxygen containing alkane dithiols with varying chain lengths and tetrathiols both independently and in tandem.

24. The method of claim 9 wherein the thiolated comonomer comprises non-oxygen containing alkane dithiols with varying chain lengths and tetrathiols both independently and in tandem.

* * * * *